US010366024B2

(12) United States Patent
Craddock et al.

(10) Patent No.: US 10,366,024 B2
(45) Date of Patent: Jul. 30, 2019

(54) SYNCHRONOUS INPUT/OUTPUT COMPUTER SYSTEM INCLUDING HARDWARE INVALIDATION OF SYNCHRONOUS INPUT/OUTPUT CONTEXT

(71) Applicant: International Business Machines Corporation, Armonk, NY (US)

(72) Inventors: David F. Craddock, New Paltz, NY (US); Matthias Klein, Wappingers Falls, NY (US); Eric N. Lais, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 324 days.

(21) Appl. No.: 15/149,219

(22) Filed: May 9, 2016

(65) Prior Publication Data

US 2017/0322894 A1 Nov. 9, 2017

(51) Int. Cl.
*G06F 13/28* (2006.01)
*G06F 13/40* (2006.01)
*G06F 12/1027* (2016.01)
*G06F 12/1081* (2016.01)

(52) U.S. Cl.
CPC .......... *G06F 13/28* (2013.01); *G06F 12/1027* (2013.01); *G06F 12/1081* (2013.01); *G06F 13/4027* (2013.01); *G06F 2212/60* (2013.01); *G06F 2213/28* (2013.01)

(58) Field of Classification Search
None
See application file for complete search history.

(56) References Cited

U.S. PATENT DOCUMENTS

| 6,263,403 | B1 | 7/2001 | Traynor | |
| 8,677,180 | B2* | 3/2014 | Bayer | G06F 11/2033 714/11 |
| 9,354,967 | B1* | 5/2016 | Craddock | G06F 11/0745 |
| 9,384,086 | B1* | 7/2016 | Craddock | G06F 13/00 |
| 10,025,722 | B2* | 7/2018 | Aslot | G06F 12/1009 |
| 2012/0297097 | A1 | 11/2012 | Go et al. | |
| 2015/0281126 | A1* | 10/2015 | Regula | G06F 13/4022 709/212 |

\* cited by examiner

*Primary Examiner* — Henry Tsai
*Assistant Examiner* — Christopher A Bartels
(74) *Attorney, Agent, or Firm* — Cantor Colburn LLP; Steven Chiu

(57) ABSTRACT

A synchronous input/output (I/O) computing system includes a processor and a memory unit that stores program instructions. The system is configured to purge a device table cache (DTC) in response to the processor executing the program instructions. An operating system runs on the synchronous I/O computing system and issues a synchronous I/O command indicating a request to perform a device table entry transaction that has a total data length to be transferred. A device table entry is selected from a device table, loaded into the DTC, and data packets corresponding to the device table entry transaction are transferred using the selected device table entry. A host bridge processor monitors the data packets transferred using the selected table entry, and automatically purges the selected device table entry from the DTC in response to determining the transferred data packets match the total data length.

17 Claims, 6 Drawing Sheets

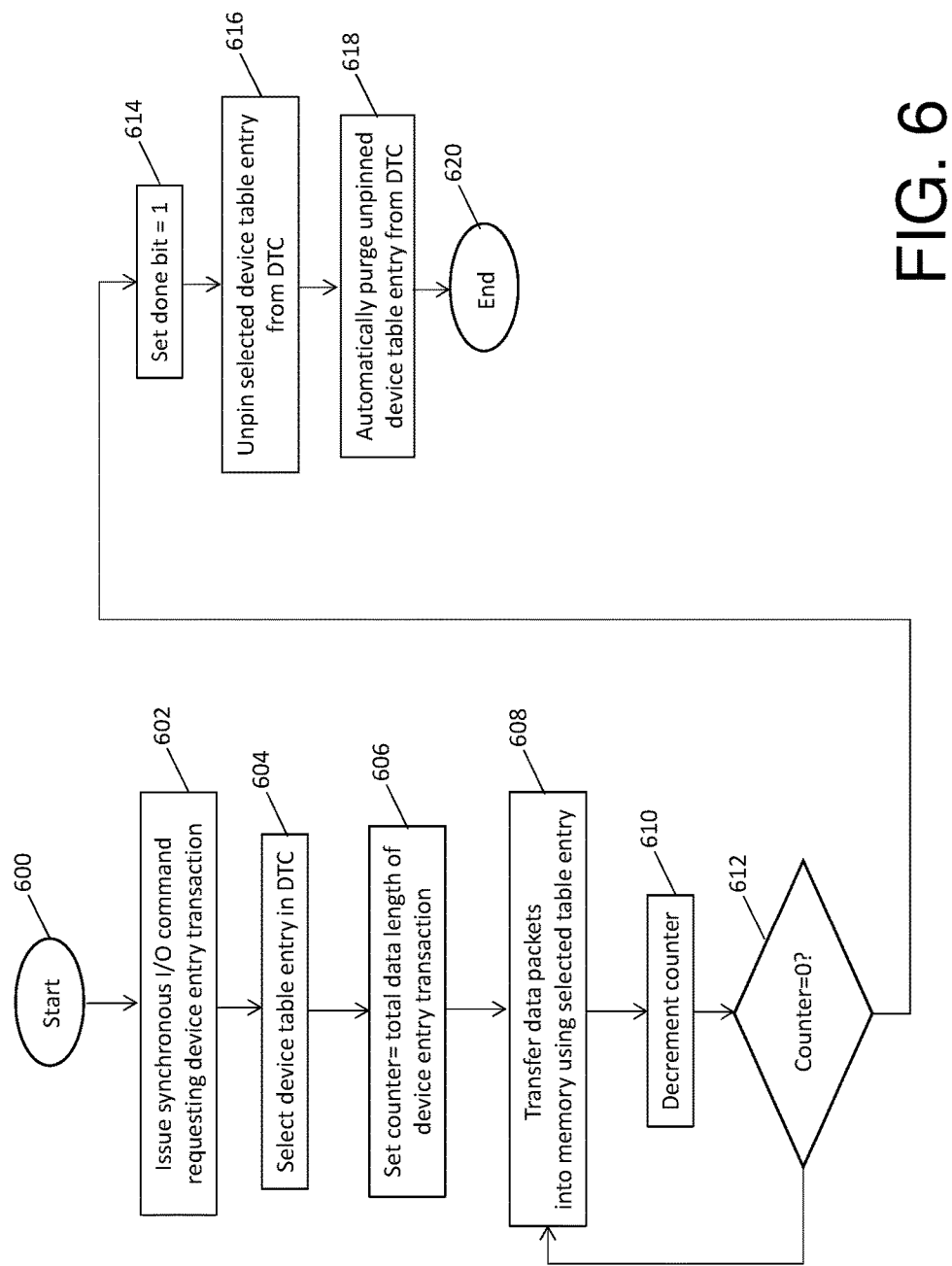

SYNCHRONOUS INPUT/OUTPUT COMPUTER SYSTEM INCLUDING HARDWARE INVALIDATION OF SYNCHRONOUS INPUT/OUTPUT CONTEXT

BACKGROUND

The disclosure relates generally to computer systems that implement synchronous input (I/O) commands, and more specifically, to computer systems including a Device Table Cache (DTC) that caches device table entries (DTEs) associated with synchronous I/O translations.

In general, the technical field discussed herein includes communications between servers and storage control units over a storage area network involving multiple switches and multiple layers of a protocol stack. Contemporary implementations of these communications between servers and storage control units include asynchronous access operations by operating systems within the storage area network. Asynchronous access operations require queues and schedulers for initiating the requests, along with interruptions for any associated context switch for processing a completion status. These queues, schedulers, and interruptions amount to asynchronous overhead that adds significant latency and processing delays across the storage area network.

Storage Area Networks (SANs), as described by the Storage Networking Industry Association (SNIA), are high-performance networks that enable storage devices and computer systems to communicate with each other. In large enterprises, multiple computer systems or servers have access to multiple storage control units within the SAN. Typical connections between the servers and control units use technologies such as Ethernet or Fibre-Channel, with the associated switches, I/O adapters, device drivers and multiple layers of a protocol stack. Fibre-channel, for example, as defined by the INCITS T11 Committee, defines physical and link layers FC0, FC1, FC2 and FC-4 transport layers such as the Fibre Channel Protocol (FCP) for SCSI and FC-SB-3 for Fibre Connectivity (FICON). There are many examples of synchronous and asynchronous I/O access methods, each with their own advantages and disadvantages. Synchronous I/O causes a software thread to be blocked while waiting for the I/O to complete but avoids context switches and interrupts. However, conventional synchronous I/O requires firmware to purge a device table entry when the corresponding transaction has completed. This works well when the I/O is locally attached with minimal access latency, but as access times increase, the non-productive processor overhead of waiting for the I/O to complete becomes unacceptable for large multi-processing servers.

SUMMARY

According to a non-limiting embodiment, a synchronous input/output (I/O) computing system includes a processor and a memory unit that stores program instructions. The system is configured to purge a device table cache (DTC) in response to the processor executing the program instructions. An operating system runs on the synchronous I/O computing system and issues a synchronous I/O command indicating a request to perform a device table entry transaction that has a total data length to be transferred. A device table entry is selected from a device table, loaded into the DTC, and data packets corresponding to the device table entry transaction are transferred using the selected device table entry. A host bridge processor monitors the data packets transferred using the selected table entry, and automatically purges the selected device table entry from the DTC in response to determining the transferred data packets match the total data length.

According to another non-limiting embodiment, a method of purging a device table cache (DTC) included in a synchronous input/output (I/O) computing system comprises issuing, via an operating system running on the synchronous I/O computing system, a synchronous I/O command indicating a request to perform a device table entry transaction that has a total data length to be transferred. The method further includes selecting a device table entry from a device table, loading the device table entry into the DTC, and transferring data packets corresponding to the device table entry transaction using the selected device table entry. The method further includes monitoring, via a host bridge processor, the data packets transferred using the selected table entry, and automatically purging the selected device table entry from the DTC, via the host bridge processor, in response to determining the transferred data packets match the total data length.

According to still another non-limiting embodiment, a computer program product comprises a computer readable storage medium having program instructions for purging a device table cache (DTC) included in a synchronous input/output (I/O) computing system. The program instructions are executable by a processor to perform operations of issuing, via an operating system running on the synchronous I/O computing system, a synchronous I/O command indicating a request to perform a device table entry transaction that have a total data length to be transferred. The operations further include selecting a device table entry from a device table of the DTC, and transferring data packets corresponding to the device table entry transaction into the selected device table entry. The operations further include monitoring, via a host bridge processor, data packets transferred using the selected table entry, and automatically purging the selected device table entry from the DTC, via the host bridge processor, in response to determining the transferred data packets match the total data length.

Additional features are realized through the techniques of the present invention. Other embodiments are described in detail herein and are considered a part of the claimed invention. For a better understanding of the invention with the features, refer to the description and to the drawings.

BRIEF DESCRIPTION OF THE DRAWINGS

FIG. 6 is a flow diagram illustrating a method of automatically purging device table entries from a device table cache without firmware assistance according to a non-limiting embodiment.

DETAILED DESCRIPTION

Figure 1:
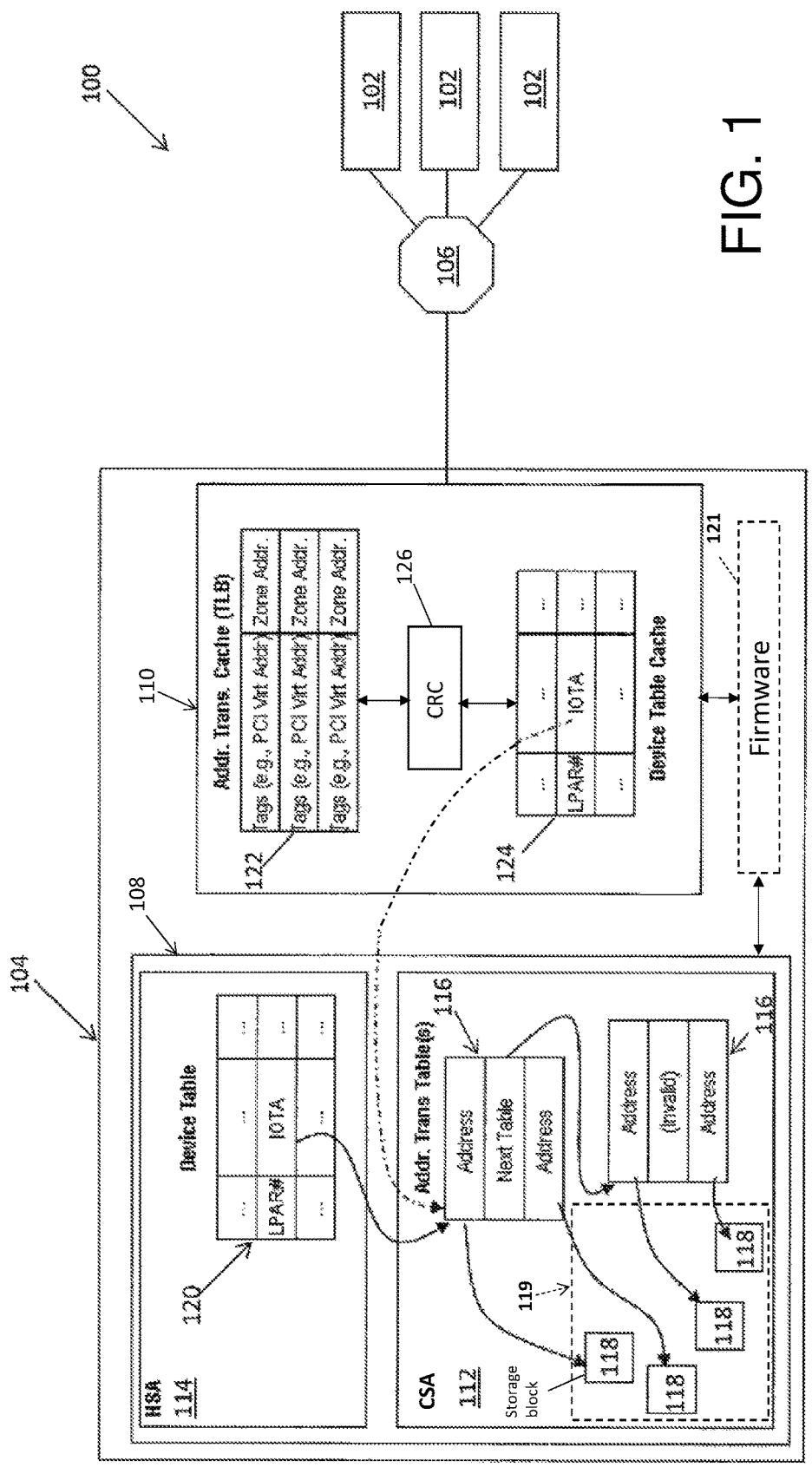
FIG. 1 depicts a synchronous I/O computing system environment configured to automatically purge a device table entry from a device table cache without firmware assistance in accordance with a non-limiting embodiment.

Conventional computer systems including synchronous I/O typically implement a host bridge hardware component which includes a device table cache (DTC) that caches a limited amount of entries (e.g., 128 entries). When performing synchronous I/O transactions, the associated device table entries are pinned in the DTC for the duration of the transaction. An entry may be pinned when it is required to be resident beyond the execution of a single instruction (e.g., for the duration of an I/O operation). An entry in the pinned state is an indication to the host bridge that the entry is ineligible for purging, and therefore is maintained in the DTC. There are many instances, however, where it is necessary or desirable to keep the DTC up-to-date. Accordingly, it is necessary or desirable to purge un-used or out-of-date entries (i.e., stale entries) from the DTC. In addition, the out-of-date entries must first be un-pinned before being purged.

In conventional I/O systems, the host bridge hardware is unaware that one or more device table entries should be purged. Therefore, conventional I/O computer systems implement firmware to un-pin and invoke purging of the out-of-date entry. That is, for each device table entry that is used for a new transaction, the firmware is responsible for ensuring that any out-of-date entry is invalidated, and thus must output a purge command. However, significant CPU cycle and resources are necessary to inform the firmware of the status of the synchronous I/O transactions in the system, and to inform the firmware when it is appropriate to un-pin and purge an out-of-date entry. Additional latency and CPU cycles are also consumed each time the firmware outputs the purge command. When large numbers of transactions occur as is typically the case on large systems, significant latency issues are realized. Consequently, relying on firmware to un-pin and purge an out-of-date entry from the DTC increases costs in CPU cycles, resource usage, and latency.

According to various non-limiting embodiments, a synchronous I/O computer system is provided that includes a HW extension to the host bridge hardware component (e.g., host bridge processor). This HW extension allows the host bridge module to be aware of the hardware transactions, and the transactions associated with the DTC. In at least one embodiment, the host bridge module monitors data packets transferred using a selected device table entry during a transaction, and automatically purges the selected device table entry from the DTC in response to determining that the device entry transaction has completed.

In at least one embodiment, the host bridge module may monitor the state indicated by the CRC unit to determine the state of a CRC operation associated with a device table entry transaction. Since the host bridge module is inherently aware of the transaction and the status of the DTC, the host bridge module can determine when no dynamic memory access (DMA) operations are expected or allowed for a device table entry, and utilizes this information to automatically unpin and automatically purge the corresponding device table entry from the DTC. In this manner, entries are unpinned and purged from the DTC using only the hardware (i.e., host bridge module), thereby freeing up the firmware to perform other operations in the system. Accordingly, a synchronous I/O computer system with improved operating efficiency and latency is provided.

With reference now to FIG. 1, a computer system 100 is generally shown according to an exemplary embodiment. The computer system 100 includes one or more PCI adapters 102 in electrical communication with a computer processor 104. The PCI adapters 102 may contain one or more PCI functions (e.g., PCI devices). The PCI adapters 102 may communicate with the computer processor 104 via a switch 106, such as a PCI Express (PCIe) switch. Although a single switch 106 is illustrated, it is appreciated that multiple switches may be included in the computer system 100. The PCI adapters 102 are configured to request access to a DMA address space in connection with a read and/or write (read/write) operation. The request may be routed over PCI or analogously over PCIe to the computer processor 104 via the switch 106 as understood by one of ordinary skill in the art.

The computer processor 104 comprises a memory unit 108 and a host bridge module 110 (i.e., a host bridge computer processor). The memory unit 108 includes a customer-accessible storage area (CSA) 112 and a protected hardware-storage area (HSA) 114. The CSA 112 may comprise one or more logical partitions (LPARs). Although the CSA 112 is illustrated having a single LPAR, it is appreciated that the CSA 112 may include multiple LPARs. The LPAR stores one or more address translation tables 116. The address translation tables 116 may also be stored in the HSA 114. Each address translation table 116 maps one or more virtual addresses to respective blocks of absolute data storage, i.e., data storage blocks 118 as understood by one of ordinary skill in the art. The data storage blocks 118 may comprise blocks of various storage page or frame sizes. For example, a virtual address is generally broken into pages, segments, and, when necessary, regions. The underlying block(s) of real or absolute storage to which the virtual address translates is referred to as a frame (or page frame, segment frame, and region frame).

The CSA 112 may further include a storage control unit (SCU) 119 configured to control data transfer between the CSA 112 and the host bridge module 110. The SCU 119 and the host bridge module 110 may communicate via any network or communication system known in the art.

The HSA 114 is a storage area of memory in which the device table 120 resides. Firmware executed by the computer processor 104 stores data into the device-table entries. For example, the device table 120 lists one or more input/output translation anchors (IOTAs), each of which points to a series of one or more address translation tables stored in a corresponding LPAR or the HSA 114. The HSA 114 is accessible by firmware 121 of the computer processor 104. In this regard, the computer processor 104 determines which particular data storage blocks 118 correspond to a respective virtual address mapped through the address translation tables 116.

The host bridge module 110 bridges a PCI interface with a memory bus installed in the computer processor 104. In this regard, the host bridge module 110 allows the PCI adapters 102 and the memory unit 108 to communicate with one another. The host bridge module 110 includes one or more PCI input/output (I/O) translation-look-aside buffers (TLBs) such as an address table (AT) cache 122, for example, and one or more device table caches (DTC) 124. According to an embodiment, the host bridge module 110 directly accesses each AT cache 122. The AT cache 122 is a high-speed cache of previous PCI address-translations, which allows for reducing the number of main-storage accesses needed to perform subsequent translations. The DTC 124 may include various selected entries corresponding to a PCI function associated with a respective PCI adapter 102. In this regard, the AT cache 122 and the DTC 124 are utilized by a dynamic memory access (DMA) operation to translate a PCI virtual address into an absolute address corresponding to a PCI function associated with the respective PCI adapter 102 as understood by one of ordinary skill in the art. With respect to the DTC 124, for example, a device table may be disposed in the memory unit 108, e.g., in dynamic read access memory (DRAM)). The host bridge 110 fetches one or more device table entries from among several entries (e.g., 64,000 entries in the device table) as required and maintains them in the DTC 124, which includes a much lower number of entries (e.g. 64 entries). In at least one embodiment, a device table entry is selected from a device table, loaded into the DTC 124, and the data packets corresponding to the device table entry transaction are transferred using the selected device table entry. Accordingly, when a first packet transferred according to the requested device table entry transaction is detected by the host bridge module 110, the corresponding device table entry is extracted from the memory unit 108 and loaded into the DTC 124.

The computer processor 104 may dynamically update the translation tables 116 based on various system needs. As a result, the AT cache 122 and the DTC 124 must be refreshed and previously cached translation entries (i.e., AT entries and device table entries) are purged. In terms of a PCI instruction, for example, a device table entry in the device table of the memory unit 108 is updated and a corresponding device table entry in DTC 124 in the host bridge 110 is flushed in synchronization with the PCI instruction to prevent an obsolete copy of the device table entry being used by the host bridge 110.

The host bridge module 110 may also include a hardware state machine 126. The state machine 126 may include one or more data counters. In at least one embodiment, each data counter is associated with a given PCI I/O transaction and a corresponding device table entry. That is, a counter index is provided for each device table entry so that the counters can be selectively associated with one or more device table entries with particular counters being associated with a single device table entry to provide counts on a PCI function basis or with particular counters being associated with DTE groups (e.g., all virtual functions (VFs) for a single adapter could be grouped to provide a single count per adapter). The data counters are incremented by the host bridge module 110 as each DMA read or write request is processed. Accordingly, the host bridge module 110 is made aware of the transaction activity and is capable of measuring the activity for each PCI function/group of PCI functions and/or can determine the state of a particular transaction, e.g., device table entry transaction.

In at least one embodiment, the hardware state machine 126 of the host bridge module 110 may be configured as a cyclic redundancy check (CRC) unit 126 capable of reflecting various CRC states. The CRC states include, for example, (1) an IDLE state, (2) a TRANSACTION state, (3) a WRITE REQUEST ONGOING state, and (4) an OPERATION COMPLETE state. The IDLE state indicates a non-CRC event or that a CRC event has not yet been identified. The TRANSACTION state indicates that a CRC event is ongoing. The WRITE REQUEST ONGOING state indicates a device table entry (DTE) write-back request associated with a synchronous I/O is ongoing. The OPERATION COMPLETE state indicates that a CRC operation has completed after completing the DTE write-back associated with a synchronous I/O. According to a non-limiting embodiment, the CRC unit 126 may determine a DTE write-back is complete based on a byte count corresponding to the amount of data transferred for the respective device transaction. This byte count monitoring feature is described in greater detail below.

At the start of a synchronous I/O, the host bridge module 110 pins a DTC entry when it is associated with a CRC transaction. The host bridge module 110 includes a hardware (HW) extension corresponding to the DTC 124. The HW extension (i.e., the host bridge module 110) is inherently aware of the hardware transactions, and the transactions associated with the DTC 124. In at least one embodiment, the host bridge module 110 monitors the state indicated by the CRC unit 126 to determine the state of a CRC operation associated with a device table entry transaction.

According to a non-limiting embodiment, whenever the total data transfer associated with a device table entry is complete (e.g. based on the byte count for the transaction), the host bridge module 110 automatically unpins the corresponding device table entry from the DTC 124. In addition, the host module 110 is configured to automatically purge the entry from the DTC 124 in response after the unpinning has completed. In this manner, not only is the host bridge module 110 capable of pinning DTC entries, but it is also configured to automatically unpin DTC entries and automatically purge the unpinned entries when they are no longer needed. In at least one embodiment, the host bridge module 110 includes a data counter (not shown in FIG. 1). Once the total bytes reaches 0, the host bridge module 110 may transition a bit (e.g., from 0 to 1) included in the device table entry associated with the completed transaction, and may output a command to set the state of the CRC to the CRC OPERATION COMPLETE state. In this manner, the firmware 121 may be aware that the previous transaction is complete.

Accordingly, unlike conventional synchronous I/O systems which require the firmware to release and purge pinned DTC entries after a corresponding transaction has completed, at least one embodiment provides a hardware extension (instead of firmware) such that the host bridge module 110 automatically unpins DTC entries and also automatically purges the unpinned entry from the DTC 124. This HW extension eliminates the need to use the firmware for purging DTC entries thereby reducing latency in the synchronous I/O protocol. In addition, table entry access busytime is decreased, while effectively increasing the cache size of the DTC 124. The HW extension provided by at least one embodiment also reduces firmware CPU cost for synchronous I/O and reduces the overall load on the system 100. It should be appreciated that the system 100 may still implement firmware; however, the firmware is not utilized to unpin and/or purge DTC entries. Accordingly, the firmware may be freed to perform other operations in the system 100.

A PCI adapter 102 may request data stored in one or more data storage blocks 118 which correspond to the PCI function associated with the PCI adapter 102. In addition, an external storage control unit or other device may request data read or stored over the PCIe link. When requesting the data from the storage blocks 118, the PCI adapter 102 communicates a direct memory access (DMA) message to the host bridge 110 via the switch 106. The DMA message includes an anticipated virtual address and a request identifier (RID). The anticipated virtual address is generated by the PCI function associated with the PCI adapter 102. The resource identification value (RID) may be utilized as an index into the device table 120, to obtain a device table entry that contains the IOTA. A portion of the PCIe address may also be used as an index into the device table 120. The IOTA in turn indicates the proper set of address translation tables 116 including the mapping of the virtual address to the data storage block 118 sought by the PCI adapter 102 or storage control unit. Accordingly, the anticipated virtual address may be translated into an absolute address associated with a respective data storage block 118.

Figure 2:
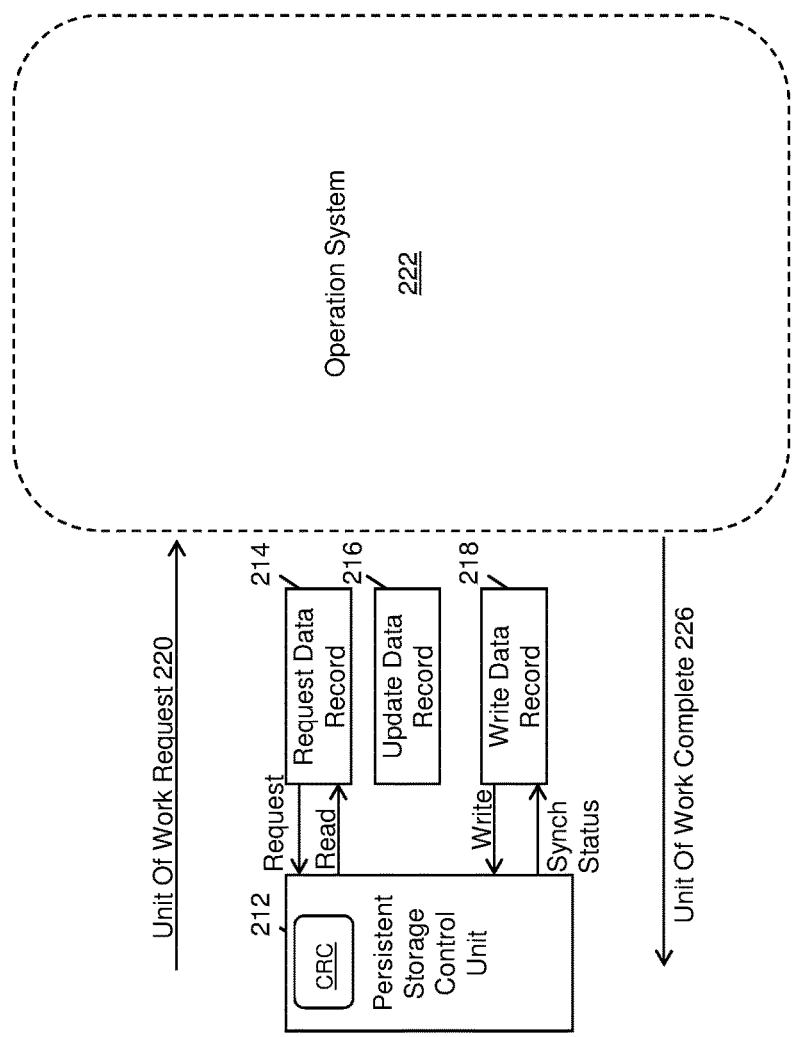
FIG. 2 illustrates communication schematic of a synchronous I/O when updating data stored on a peripheral storage device is illustrated according to a non-limiting embodiment.

Turning to FIG. 2, communication schematic 200 of a synchronous I/O process performed in a synchronous I/O computing system when updating data stored on a storage device (e.g., a peripheral storage device) is illustrated according to a non-limiting embodiment. Performing a synchronous I/O includes receiving a unit of work request 220 at an operating system (OS) 222. In response to receiving the unit of work request 220, the OS 222 performs the processing shown in block 214 which includes synchronously requesting a data record 214 from a SCU 212 such as, for example, a persistent SCU 212. Since the OS 222 is aware of the data record 214 to be requested, the OS 222 is also inherently aware of the total bit length of the data record.

In at least one embodiment, the OS 222 requests a data record from the persistent SCU 212 and waits until the requested data record 214 is received from the persistent SCU 212. The data request includes generating a synchronous I/O command, which includes a parameter that specifies the length of bytes to be transferred. The synchronous I/O command output from the OS 222 also invokes the firmware. In turn, a device table entry (from the device table) that is free and available to be used for the transaction is selected. The firmware, for example, may select the device table entry. In some embodiments, however, the host bridge module of the system may selected the device table entry. The firmware sets up the device table entry with the parameters applicable for the ensuing transaction, and then sends the exchange request to the SCU 212. The parameters include, for example, the address translation information, and the number of total bytes to be exchanged for completing the transaction. In response to receiving the data exchange request (e.g., read operation), the SCU 212 locates the data corresponding to the particular transaction (e.g., the data to be read), and transfers the data to the OS 222 (e.g., the server), which is also detected by a host bridge module included in the synchronous computing system.

Once the data record is received by the OS 222, the OS 222 performs the processing in block 216 to generate an updated the data record 218. Updating of the data record 218 may include modifying the DTC included in the host bridge module 110 module (not shown) based on the data transmission length specified by the synchronous I/O command generated by the OS (e.g., host bridge module). The firmware is invoked in response to the synchronous I/O request, and dynamically sets up a device table entry with the address translation parameters, including the total bit length of a respective I/O operation. Accordingly, the host bridge module becomes aware of the DTC setup and is able to determine the total byte count associated with each DTC transaction.

At block 218, the updated data record is synchronously written to the persistent SCU 212. A synchronous status message is sent from the persistent SCU 212 to the OS 222 to indicate the data has been successfully written. At this point, the unit of work is complete 226. As shown in FIG. 2, the unit of work may remain active (i.e., it is not un-dispatched and re-dispatched) until the OS 222 is notified that the I/O request is completed (e.g., data has been read from persistent SCU 212, data has been written to persistent SCU 212, error condition has been detected, etc.).

In addition, the host bridge module executing the OS 222 is aware the work is complete since it is initially aware of the initial data transmission length, and monitors the data transmission. In at least one embodiment, the host bridge module includes a data counter (not shown in FIG. 2) that determines the bytes exchanged over the I/O channel 415.

According to a non-limiting embodiment, the host bridge module sets the data counter to an initial value prior to transferring the data packets. Once the device entry table transaction begins the host bridge module decrements the data counter each time a data packet is transferred. When the data counter reaches a final value, the host bridge module determines that the device table transaction is complete, automatically unpins the device table entry from the DTC without receiving an unpin command from firmware and/or automatically purges the device table entry without receiving a purge command from firmware. The initial value may be set at zero (0), while the final value is set as the total data length of the device table entry to be transferred to the device table entry. Alternatively, the value may be set as the total data length of the device table entry to be transferred to the device table entry while the final value is set as zero (0).

For instance, the host bridge module (e.g., OS) is aware of the total byte length of each requested transaction and therefore dynamically sets the counter equal to the total byte length for the ensuing data exchange. Since each transaction has its own individual data transfer length, the initial data counter may be dynamically set to different initial values. Accordingly, the counter is set to different initial values based on each ensuing transaction. The counter is then decremented as the bytes of the requested transaction are exchanged over the I/O channel 415. When the counter reaches zero (0), the host bridge determines that transaction is complete (e.g., no future data will be output from the corresponding device). The OS determines that the transaction has completed when the synchronous command completes. In at least one embodiment, once the total data transmission length has been exchanged, the host bridge module determines the unit of work is complete and sets the CRC state to CRC OPERATION COMPLETE, as described above.

In at least one embodiment, the device table entry of the DTC includes a bit field (e.g., done bit) that may be written to by the host bridge module. In response to determining the data counter has reached 0, the host bridge module may transition the done bit (e.g., from 0 to 1). The firmware may monitor the done bit, and when detecting that the done bit has been transitioned, determines that the transaction is complete. After the transaction is determined as complete (e.g., the data counter reaches 0), the host bridge module automatically unpins the corresponding device table entry from the DTC and automatically purges the entry from the DTC. In this manner, not only is the host bridge module capable of pinning DTC entries, but it is also configured to automatically unpin DTC entries and automatically purge the unpinned entries when they are no longer needed.

Thus, as shown in FIG. 2, synchronous I/O provides an interface between a server and a persistent SCU that has sufficiently low overhead to allow an OS to synchronously read or write one or more data records. In addition to the low overhead protocol of the link, an OS executing on the server can avoid the scheduling and interruption overhead by using a synchronous command to read or write one or more data records. Thus, embodiments of synchronous I/O as described herein when compared to traditional I/O not only reduce the wait time for receiving data from a persistent SCU, they also eliminate steps taken by a server to service the I/O request. Steps that are eliminated can include the un-dispatching and re-dispatching of a unit of work both when a request to read data is sent to the persistent SCU and when a request to write data is sent to the persistent SCU. This also provides benefits in avoiding pollution of the processor cache that would be caused by un-dispatching and re-dispatching of work.

As used herein, the term "persistent storage control unit" or "persistent SCU" refers to a storage area network (SAN) attached storage subsystem with a media that will store data that can be accessed after a power failure. As known in the art, persistent SCUs are utilized to provide secure data storage even in the event of a system failure. Persistent SCUs can also provide backup and replication to avoid data loss. A single persistent SCU is typically attached to a SAN and accessible by multiple processors.

As used herein, the term "synchronous I/O" refers to a CPU synchronous command that is used to read or write one or more data records, such that when the command completes successfully, the one or more data records are guaranteed to have been transferred to or from the persistent storage control unit into host processor memory.

Figure 3:
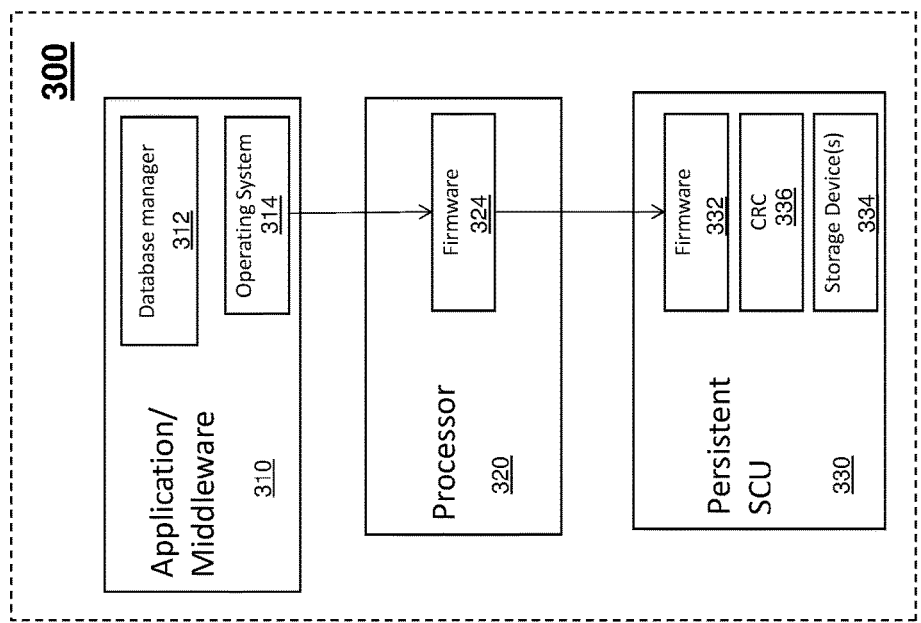
FIG. 3 is a block diagram illustrating an environment including a synchronous I/O link interface according to a non-limiting embodiment.

Turning now to FIG. 3, a block diagram of a system 300 (e.g., synchronous system 300) for performing synchronous I/O is generally shown in accordance with an embodiment. The system 300 shown in FIG. 3 includes one or more application/middleware 310, one or more physical processors 320, and one or more persistent SCUs 330. The application/middleware 310 can include any application software that requires access to data located on the persistent SCU 330. The SCU 330 locates the data corresponding to a particular transaction (e.g., the data to be read), and transfers the data to the OS 310 using a device table entry that is dynamically selected. The device table entry may be dynamically selected by firmware, or in some embodiment, may be dynamically selected by the host bridge module.

The SCU 330 may be used by various data management systems including, but not limited to, a relational database manager 312 (e.g. DB2), an OS 314, a filesystem (e.g., z/OS Distributed File Service System z File System produced by IBM), a hierarchical database manager (e.g. IMS® produced by IBM), or an access method used by applications (e.g. virtual storage access method, queued sequential access method, basic sequential access method).

As shown in FIG. 3, the database manager 312 can communicate with an OS 314 to communicate a unit of work request that requires access to the persistent SCU 330. The OS 314 receives the unit of work request and communicates with firmware 324 located on the processor 320 to request a data record from the persistent SCU 330, to receive the data record from the persistent SCU 330, to update the received data record, to request the persistent SCU 330 to write the updated data record, and to receive a confirmation that the updated data recorded was successfully written to the persistent SCU 330. The firmware 324 accepts the synchronous requests from the OS 314 and processes them. Firmware 332 located on the persistent SCU 330 communicates with the firmware 324 located on the 320 to service the requests from the processor 320 in a synchronous manner.

In at least one embodiment, a data counter (not shown in FIG. 3) is included in the system 300. The counter is operated (e.g., decremented) as data packets are transferred from the SCU 330 using the device table entry for processing by the OS 314. In at least one embodiment, the OS sets the initial value of the counter equal to a total byte length of the requested data record prior to beginning the synchronous I/O transaction. When the counter reaches zero (0), the host bridge determines that the transaction is complete, and outputs a state command to set the state of the CRC 336 to the OPERATION COMPLETE state. The firmware 324 is capable of monitoring the CRC 336, and therefore can determine when the synchronous I/O transaction is complete.

As used herein, the term "firmware" refers to privileged code running on the processor that interfaces with the hardware used for the I/O communications; a hypervisor; and/or other OS software.

Embodiments described herein utilize peripheral component interconnect express (PCIe) as an example of a low latency I/O interface that may be implemented by embodiments. Other low latency I/O interfaces, such as, but not limited to Infiniband™ as defined by the InfiniBand Trade Association and zSystems coupling links can also be implemented by embodiments.

Figure 4:
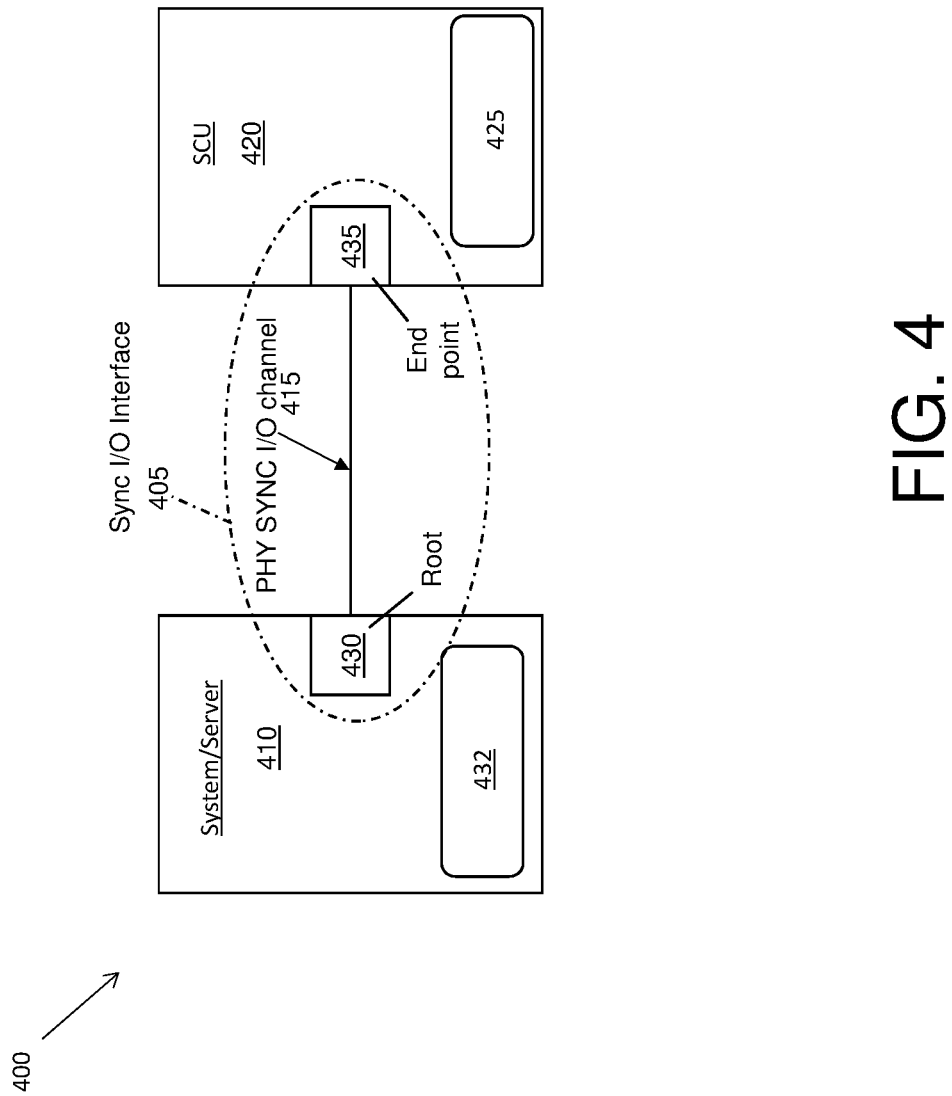
FIG. 4 is a block diagram illustrating an environment including a synchronous I/O link interface according to a non-limiting embodiment.

Referring to FIG. 4, a block diagram of an environment 400 including a synchronous I/O link interface 405 is depicted in accordance with at least one embodiment. As shown in FIG. 4, the environment 400 utilizes the synchronous I/O link interface 405 as an interface between a server (e.g., a system 410) and a SCU (e.g., a persistent SCU 420). The hardware system 410 may include an OS and a firmware while the SCU includes a data management module 425. The data management module 425 is capable of monitoring data transmission, determining data transmission length and conducting CRC operations.

As discussed above, the OS of the system 410 may perform various processing operations which include synchronously requesting a data record from the SCU 420. Since the OS is aware of the data record to be requested, the OS is also inherently aware of the total bit length of the data record. The data request includes generating a synchronous I/O command, which includes a parameter that specifies the length of bytes to be transferred.

The synchronous I/O link interface 405 has sufficiently low latency and protocol overhead to allow an OS of the system 410 to synchronously read or write one or more data records from the persistent SCU 420. In addition to the low protocol overhead of the link, the OS can avoid the overhead associated with scheduling and interrupts by using a synchronous command via the synchronous I/O link interface 405 to read or write one or more data records. The synchronous I/O link interface 405, for example, can be provided as an optical interface based on any PCIe base specification (as defined by the PCI-SIG) using the transaction, data link, and physical layers. The synchronous I/O link interface 405 may further include replay buffers and acknowledgement credits to sustain full bandwidth.

The system 410 is configured to provide at least one synchronous I/O link interface 405 having at least one synchronous I/O link 415 to allow connection to at least one persistent SCU (e.g., persistent SCU 420). The synchronous I/O link 415 is an interface between a server (e.g., a system) and a SCU (e.g., a persistent SCU). It can be appreciated that two or more synchronous I/O links 415 may be required for each connection to a persistent SCU. It can also be appreciated that two or more synchronous I/O links 415 may support switch connections to a persistent SCU. In an exemplary embodiment, where PCIe is utilized, the system 410 comprises a PCIe root complex 430 for the interface link 415, while the persistent SCU 420 comprises a PCIe endpoint 435 for the control unit synchronous I/O interface 405.

The OS of the system 410 is capable of monitoring the data bits exchanged over the I/O channel 415. In at least one embodiment, the system 410 includes a data counter 432 that determines the bytes exchanged over the I/O channel 415. The OS is aware of the total byte length of each requested transaction and therefore may set the counter equal to the total byte length for the ensuing data exchange. The counter is then decremented as the bytes of the requested transaction are exchanged over the I/O channel 415. When the counter reaches zero (0), the host bridge determines that the transaction is complete (e.g., no future data will be output from the corresponding device), and may output a "done bit" that sets the state of the CRC (included in the data management module 425) to the OPERATION COMPLETE state as discussed in detail above. The firmware may monitor the state of the CRC and then determine that a particular transaction is complete.

Figure 5:
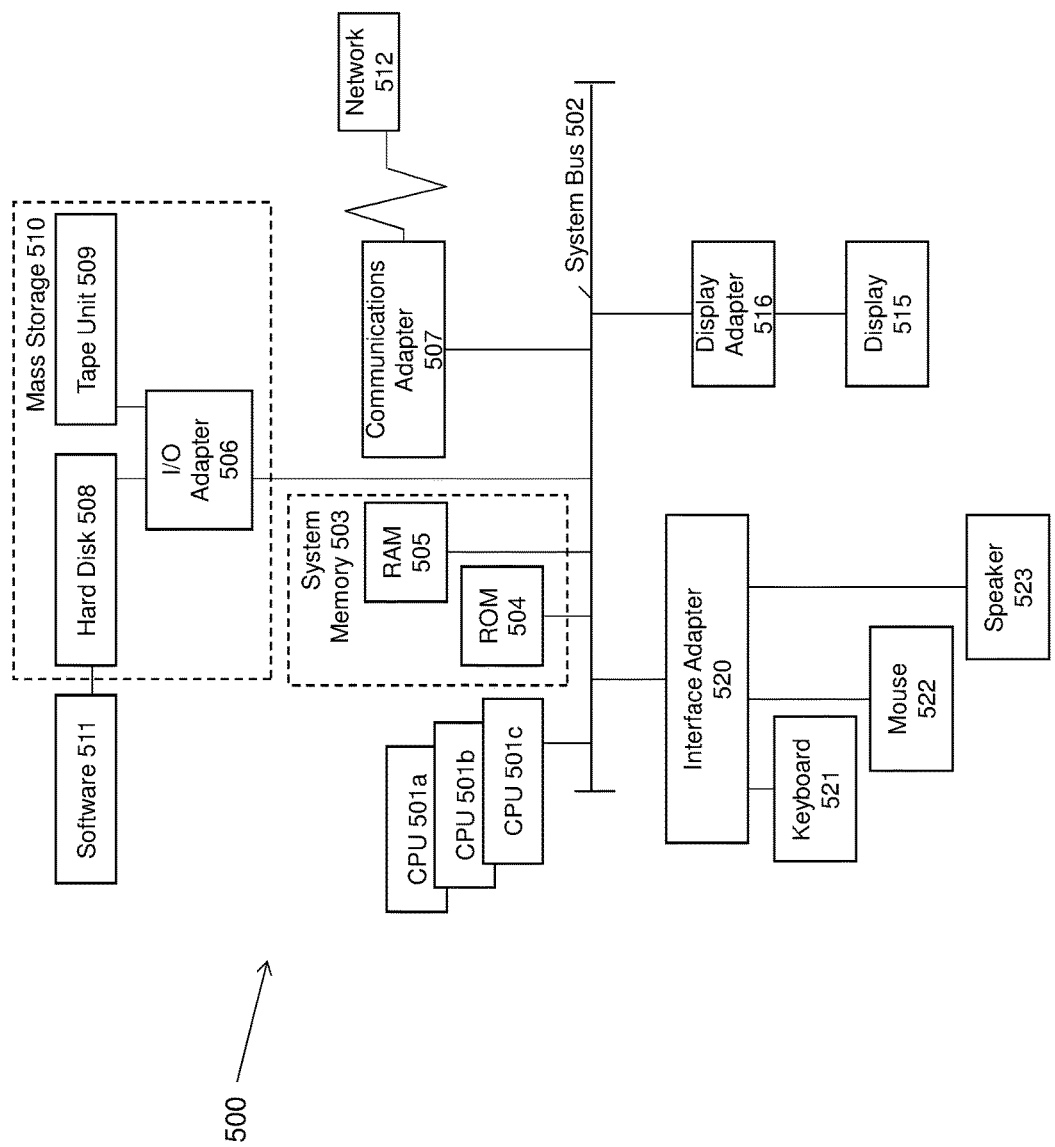
FIG. 5 illustrates a processing system capable of implementing a synchronous I/O computing system configured to purge device table entries without firmware assistance according to a non-limiting embodiment.

Referring now to FIG. 5, there is shown an embodiment of a processing system 500 for implementing the teachings herein. In this embodiment, the processing system 500 has one or more central processing units (processors) 501a, 501b, 501c, etc. (collectively or generically referred to as processor(s) 501). The processors 501, also referred to as processing circuits, are coupled via a system bus 502 to system memory 503 and various other components. The system memory 503 can include read only memory (ROM) 504 and random access memory (RAM) 505. The ROM 504 is coupled to system bus 502 and may include a basic input/output system (BIOS), which controls certain basic functions of the processing system 500. RAM is read-write memory coupled to system bus 502 for use by processors 501.

FIG. 5 further depicts an input/output (I/O) adapter 506 and a network adapter 507 coupled to the system bus 502. I/O adapter 506 may be a small computer system interface (SCSI) adapter that communicates with a hard disk 508 and/or tape storage drive 509 or any other similar component. I/O adapter 506, hard disk 508, and tape storage drive 509 are collectively referred to herein as mass storage 510. Software 511 for execution on processing system 500 may be stored in mass storage 510. The mass storage 510 is an example of a tangible storage medium readable by the processors 501, where the software 511 is stored as instructions for execution by the processors 501 to perform a method, such as the process flows above. The network adapter 507 interconnects system bus 502 with an outside network 512 enabling processing system 500 to communicate with other such systems. A screen (e.g., a display monitor) 515 is connected to system bus 502 by display adapter 516, which may include a graphics controller to improve the performance of graphics intensive applications and a video controller. In one embodiment, adapters 506, 507, and 516 may be connected to one or more I/O buses that are connected to system bus 502 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 502 via an interface adapter 520 and the display adapter 516. A keyboard 521, mouse 522, and speaker 523 can be interconnected to system bus 502 via interface adapter 520, which may include, for example, a Super I/O chip integrating multiple device adapters into a single integrated circuit.

Thus, as configured in FIG. 5, processing system 500 includes processing capability in the form of processors 501, and, storage capability including system memory 503 and mass storage 510, input means such as keyboard 521 and mouse 522, and output capability including speaker 523 and display 515. In one embodiment, a portion of system memory 503 and mass storage 510 collectively store an operating system, such as the z/OS or AIX operating system from IBM Corporation, to coordinate the functions of the various components shown in FIG. 5.

Technical effects and benefits of the embodiments herein provide advantages over asynchronous/traditional I/O commands by avoiding the overhead of interrupt processing and dispatching.

For instance, asynchronous/traditional I/O commands include the disadvantage that while waiting on an I/O operation to complete, a processor executes other productive work, causing overhead for un-dispatch and re-dispatch, context switch overhead with the I/O interrupt and the processor cache content change. In contrast, embodiments herein allow multiple synchronous I/O commands to be initiated, thus allowing multiple synchronous I/O operations to begin, while also allowing additional work to be performed before resuming the command to determine when the I/O operation completes. Further, synchronous I/O commands allow an operating system to issue multiple synchronous I/O commands to multiple targets or transfer multiple records to the same or different targets, to achieve parallelism and thus improved performance over multiple operations.

In another example, traditional enterprise storage attachments, such as Fiber Connection (FICON) and Fibre Channel Protocol (FCP), have multiple protocol layers that require several hardware, firmware and software levels of processing which cause overhead and add latency. In contrast, the synchronous I/O of embodiments herein eliminates many of these layers, thus improving system efficiency while providing the enterprise qualities of service that includes end-to-end data integrity checking, in-band instrumentation and measurements, workload management and continuous availability with predictable and repeatable high performance.

Turning now to FIG. 6, a flow diagram illustrates a method of purging a device table cache included in a synchronous I/O computing system according to a non-limiting embodiment. The method begins at operation 600, and at operation 602 a synchronous I/O command requesting a device entry transaction is issued. In at least one embodiment, the synchronous I/O command includes a parameter that specifies the length of bytes to be transferred and is issued by the OS of the synchronous I/O computing system. At operation 604, a device table entry is selected from the device table to be included in the device table cache. In at least one embodiment, the firmware of the synchronous I/O computing system dynamically selects the device table entry to be used for the transaction and sets up the device table entry with the parameters applicable for the ensuing transaction. The parameters include, for example, the address translation information, and the number of total bytes to be exchanged for completing the transaction. At operation 606, the host bridge processor of the synchronous I/O computing system sets an initial value of a data counter equal to a total transaction data length, i.e., the number of total bytes to be exchanged for completing the transaction. At operation 608, the data packets are transferred using the selected device table entry. That is, data is transferred to the memory, but information from the data table entry is used to perform the data transfer. At operation 610, the host bridge processor decrements the counter according to the data packets transferred at operation 610. At operation 612, the counter is monitored to determine whether the current counter value has reached zero (0). When the counter has not reached 0, the counter returns to operation 608 and the data packets of the device table transaction continue to be transferred.

When, however, the counter has reached 0, the host bridge processor sets a done bit value (e.g., from 0 to 1) included in the DTC at operation 614. At operation 616, the device table entry corresponding to the completed device entry transaction is unpinned. At operation 618, the host bridge module automatically purges the unpinned entry from the DTC without receiving a purge command from the firmware, and the method ends at operation 620.

Embodiments described herein provide SAN attached external persistent storage for synchronous access. In addition, embodiments provide the dynamic switching between synchronous I/O and asynchronous I/O access. Shareable external SAN storage typically will have a mix of short and long running I/O operations which can utilized and benefit from this ability to dynamically switch between the synchronous and asynchronous selection. Embodiments also provide a means for notifying software when the data is not available for synchronous access and the dynamic switching to asynchronous access.

Embodiments described herein provide a low-latency protocol for server to SAN storage communication that allows synchronous I/O access with its inherent advantages of avoiding context switches, interruptions and processor cache pollution, while also providing mechanisms for avoiding processor blocking when access times become too great. Mechanisms are described for dynamic notification and selection of synchronous or asynchronous I/O access.

Thus, embodiments described herein are necessarily rooted in processing system to perform proactive operations for efficiently replicating data across multiple storage subsystems in order to provide continuous availability to overcome problems specifically arising in the realm of traditional I/O and storage subsystem failures.

The embodiments herein may be a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments herein are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the embodiments herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

As used herein, the term "module" refers to an application specific integrated circuit (ASIC), an electronic circuit, an electronic computer processor (shared, dedicated, or group), microprocessor and memory that executes one or more software or firmware programs, a microcontroller, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

The descriptions of the various embodiments of the embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of purging a device table cache (DTC) included in a synchronous input/output (I/O) computing system, the method comprising:
    issuing, via an operating system running on the synchronous I/O computing system, a synchronous I/O command indicating a request to perform a device table entry transaction, the device table entry transaction having a total data length to be transferred;
    selecting a device table entry from a device table, loading the entry into the DTC, and transferring data packets corresponding to the device table entry transaction using the selected device table entry;
    monitoring, via a host bridge processor, the data packets transferred using the selected table entry; and
    automatically purging the selected device table entry from the DTC, via the host bridge processor, in response to determining the transferred data packets match the total data length,
    wherein the host bridge processor automatically unpins the selected device table entry from the device table cache in response to determining the transferred data packets matches the total data length, and automatically purges the unpinned device table entry from the device table cache.

2. The method of claim 1, wherein the monitoring includes operating a data counter to count the data packets transferred using the device table entry.

3. The method of claim 2, wherein the host bridge processor performs the operations of:
    setting the data counter to an initial value prior to transferring the data packets;
    decrementing the data counter each time a data packet is transferred using the device table entry; and
    automatically purging the selected device table entry without receiving a purge command from firmware when the data counter reaches a final value indicating the device table entry transaction is complete.

4. The method of claim 3, wherein the initial value equals the total data length and the final value equal zero.

5. The method of claim 1, wherein the host bridge processor sets a done bit value included in the device table entry in response to determining the transferred data packets match the total data length.

6. The method of claim 1, further comprising setting a state machine included in the host bridge processor to an operation complete state indicating that a CRC operation associated with the device table entry transaction in response to determining the transferred data packets match the total data length.

7. A computer program product, the computer program product comprising a computer readable storage medium having program instructions for purging a device table cache (DTC) included in a synchronous input/output (I/O) computing system, the program instructions executable by a processor to perform:
    issuing, via an operating system running on the synchronous I/O computing system, a synchronous I/O command indicating a request to perform a device table entry transaction, the device table entry transaction having a total data length to be transferred;
    selecting a device table entry from a device table, loading the entry into the DTC, and transferring data packets corresponding to the device table entry transaction using the selected device table entry;

monitoring, via a host bridge processor, the data packets transferred using the selected table entry; and automatically purging the selected device table entry from the DTC, via the host bridge processor, in response to determining the transferred data packets match the total data length, wherein the host bridge processor automatically unpins the selected device table entry from the device table cache in response to determining the transferred data packets matches the total data length, and automatically purges the unpinned device table entry from the device table cache.

8. The computer program product of claim 7, wherein the monitoring includes operating a data counter to count the data packets transferred using the device table entry.

9. The computer program product of claim 8, wherein the host bridge processor performs operation of:

setting the data counter to an initial value prior to transferring the data packets;

decrementing the data counter each time a data packet is transferred using the device table entry; and automatically purging the selected device table entry without receiving a purge command from firmware when the data counter reaches a final value indicating the device table entry transaction is complete.

10. The computer program product of claim 9, wherein the initial value equals the total data length and the final value equal zero.

11. The computer program product of claim 7, wherein the host bridge processor sets a done bit value included in the device table entry in response to determining the transferred data packets match the total data length.

12. The computer program product of claim 7, wherein the operations further comprise setting a state machine included in the host bridge processor to an operation complete state indicating that a CRC operation associated with the device table entry transaction in response to determining the transferred data packets match the total data length.

13. A synchronous input/output (I/O) computing system comprising a processor and a memory unit that stores program instructions, the system configured to purge a device table cache (DTC) in response to the processor executing the program instructions to perform:

issuing, via an operating system running on the synchronous I/O computing system, a synchronous I/O command indicating a request to perform a device table entry transaction, the device table entry transaction having a total data length to be transferred;

selecting a device table entry from a device table, loading the entry into the DTC, and transferring data packets corresponding to the device table entry transaction using the selected device table entry;

monitoring, via a host bridge processor, the data packets transferred using the selected table entry; and automatically purging the selected device table entry from the DTC, via the host bridge processor, in response to determining the transferred data packets match the total data length, wherein the host bridge processor automatically unpins the selected device table entry from the device table cache in response to determining the transferred data packets matches the total data length, and automatically purges the unpinned device table entry from the device table cache.

14. The system of claim 13, wherein the monitoring includes operating a data counter to count the data packets transferred using the device table entry.

15. The system of claim 14, wherein the host bridge processor performs operation of:

setting the data counter to an initial value prior to transferring the data packets;

decrementing the data counter each time a data packet is transferred using the device table entry; and automatically purging the selected device table entry without receiving a purge command from firmware when the data counter reaches a final value indicating the device table entry transaction is complete.

16. The system of claim 15, wherein the initial value equals the total data length and the final value equal zero.

17. The system of claim 13, wherein the host bridge processor sets a done bit value included in the device table entry in response to determining the transferred data packets match the total data length.

* * * * *